(12) United States Patent
Park et al.

(10) Patent No.: US 7,276,091 B2
(45) Date of Patent: Oct. 2, 2007

(54) METHOD OF PRODUCING POLYMER CAPACITOR BY FORMING MICROPORE IN ION EXCHANGE MEMBRANE AND POLYMER CAPACITOR PRODUCED THEREBY

(75) Inventors: Choong Nam Park, Kyungki-do (KR); Young Kwan Lee, Kyungki-do (KR); Jae Do Nam, Kyungki-do (KR); Kwi Jong Lee, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 496 days.

(21) Appl. No.: 10/962,520

(22) Filed: Oct. 13, 2004

(65) Prior Publication Data

US 2006/0046136 A1    Mar. 2, 2006

(30) Foreign Application Priority Data

Sep. 1, 2004    (KR) .................. 10-2004-0069720

(51) Int. Cl.
*H01G 9/00*    (2006.01)

(52) U.S. Cl. .................. 29/25.03; 438/393; 427/80; 257/E21.011

(58) Field of Classification Search .................. None
See application file for complete search history.

(56) References Cited

U.S. PATENT DOCUMENTS 6,949,317 B2 *   9/2005   Yoshida et al. ............. 429/303
2002/0177039 A1 *  11/2002   Lu et al. .................... 429/213

\* cited by examiner

*Primary Examiner*—Michael Lebentritt
*Assistant Examiner*—Cheung Lee
(74) *Attorney, Agent, or Firm*—Lowe Hauptman Ham & Berner

(57) ABSTRACT

A method of producing a polymer capacitor includes forming a first electrode on a surface of a first ion exchange resin solid and coating a mixture of an ion exchange resin solution and a salt on the other surface of the first resin; putting a second ion exchange resin solid which has a second electrode formed on a surface thereof on the coated layer and conducting lamination of the resulting structure to produce a composite; dissolving the salt to form pores; and filling the pores with an electrolytic solution.

11 Claims, 2 Drawing Sheets

METHOD OF PRODUCING POLYMER CAPACITOR BY FORMING MICROPORE IN ION EXCHANGE MEMBRANE AND POLYMER CAPACITOR PRODUCED THEREBY

RELATED APPLICATIONS

The present application is based on, and claims priority from, Korean Application Number 2004-69720, filed Sep. 1, 2004, the disclosure of which is hereby incorporated by reference herein in its entirety.

BACKGROUND OF THE INVENTION

1. Field of the Invention

The present invention relates to a method of producing a polymer capacitor and a polymer capacitor produced thereby. More particularly, the present invention pertains to a method of producing a polymer capacitor, in which micropores containing an electrolytic solution are formed in an ion exchange membrane, and a polymer capacitor having improved electrical properties produced thereby.

2. Description of the Prior Art

With the spread of IT products, such as mobile phones, notebook computers, and PDAs, which are handy to carry, a Ni-MH (nickel-metal hydride) secondary battery conventionally used has been replaced with a lithium ion secondary battery which has a single cell voltage three times as higher and a capacitance rather larger than in the conventional secondary battery. Due to voltage properties, depending on the type of device, as well as lower price and more stable quality than the lithium ion battery, the use of Ni—MH has continued. However, a demand for high capacitance in the same size is growing and development of the lithium ion secondary battery is accelerating because of diversified functions of the devices and a boom in development of portable devices.

With respect to the secondary battery, many studies are being conducted towards improvement of capacitance of the lithium ion battery, slimness of the lithium ion battery, improvement of performance of a lithium ion battery, which can be manufactured in a variety of different forms and development of a novel polymer battery as a next generation battery.

Meanwhile, as an example of the next generation battery, an electric double layer capacitor having electrical properties that are equal to the conventional lithium ion battery has been developed.

Additionally, another type of electric double layer capacitor has been developed, in which surface areas of electrodes are enlarged to increase an energy density. This capacitor has the energy density of 50-75 Wh/kg that is five to ten times as high as the conventional electric double layer capacitor.

A traditional secondary battery usually discharges in a level of 60-80% of the total capacitance to prolong a charge/discharge cycle life thereof. For example, a practical mass energy density of a lithium ion secondary battery having a mass energy density of 100 Wh/kg is 70 Wh/kg.

On the other hand, since the electric double layer capacitor can discharge almost completely, it has an energy density that is substantially equal to the lithium ion secondary battery. Unlike the electric double layer capacitor which employs a surface area of carbon for improvement, effort has been made to develop a polymer capacitor having a novel structure which includes metal electrodes and solid electrolytes. This is characterized in that it includes ion exchange resins and metal electrodes having a very large surface area, and has a high capacitance.

Since the metal electrodes have no active functional groups existing on a surface of carbon, an internal voltage may be increased to 2.5-6 V. Furthermore, pores may be formed in an ion exchange membrane to increase the energy density to twice as high or more as the lithium ion battery, and to assure a charging time of 1 min and a semi-permanent life. Accordingly, it is possible to use a capacitor as an energy source surpassing the performances of batteries. This exceeds the notion of the traditional capacitor.

A capacitance, namely, a performance of the polymer capacitor, depends on how many lithium ions can be contained in an electrolytic membrane. However, since there is a limit in a saturated concentration of ions capable of being contained in an electrolytic solution, a pool for collecting the electrolytic solution and then storing it, that is, pores may be formed in the electrolytic membrane so as to enable the electrolytic membrane to assure a very high capacitance in a great quantity. However, in such a case, stable electrical properties such as energy density and capacitance can be gained only when sizes, shapes and distribution of the pores are optimized.

Conventionally, a process has been adopted to form pores in an electrolytic membrane of a polymer capacitor, in which a metal chelate is adsorbed onto an ion exchange resin and reduced to deposit a metal on a surface of the resin to form: metal electrodes, and voltage is then applied to the metal electrodes while the resulting structure is dipped in an electrolytic solution.

In the above process, the pores are formed due to electrolysis of water contained in the resin. At this time, it is known that sizes or the number of the pores are adjusted by controlling the applied voltage and pressure. Another process of forming pores by rapidly evaporating water from a surface of a membrane is also known. However, it is believed that it is difficult to control the number or sizes of the pores through this process.

SUMMARY OF THE INVENTION

Therefore, an object of the present invention is to provide a method of producing a polymer capacitor, in which sizes and distribution of pores filled with an electrolytic solution in an ion exchange membrane are easily controlled.

Another object of the present invention is to provide a method of producing a reproducible polymer capacitor having excellent electrical properties, such as capacitance and energy density.

A further object of the present invention is to provide a polymer capacitor having excellent electrical properties, such as capacitance and energy density.

The above objects can be accomplished by providing a method of producing a polymer capacitor, which includes forming a first metal electrode on a surface of a first ion exchange resin solid and coating a mixture of an ion exchange resin solution and a salt on the other surface of the first ion exchange resin solid; putting a ion exchange resin surface of a second ion exchange resin solid having a second metal electrode formed on a surface thereof on the coated layer of the mixture of the ion exchange resin solution and salt, and conducting lamination of the resulting structure to produce a composite; dipping the composite into water or an organic solvent to dissolve the salt and thus form pores; and filling the pores with an electrolytic solution.

Furthermore, the present invention provides a polymer capacitor, which comprises two metal electrodes and an ion exchange resin interposed between the two metal electrodes, the ion exchange resin including a plurality of uniform micropores filled with an electrolytic solution.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of the present invention.

In a conventional polymer capacitor, when pores are formed in an ion exchange membrane, it is impossible to uniformly control the number, sizes and distribution of the pores, and thus, nonuniform internal pores are formed. Therefore, the capacitor is problematic in that electrical properties, such as a capacitance and an energy density, are unstable, poor and non-reproducible.

However, in the present invention, after an ion exchange resin layer is formed using a mixture of an ion exchange resin solution and a salt, the salt is removed from the ion exchange resin layer by dissolution. Thereby, it is possible to uniformly control the number, sizes and distribution of pores in a polymer capacitor. Furthermore, the polymer capacitor having the pores, which are filled with an electrolytic solution and formed in the ion exchange resin layer, reproducibly provides excellent electrical properties, such as a capacitance and an energy density.

Figure 1:
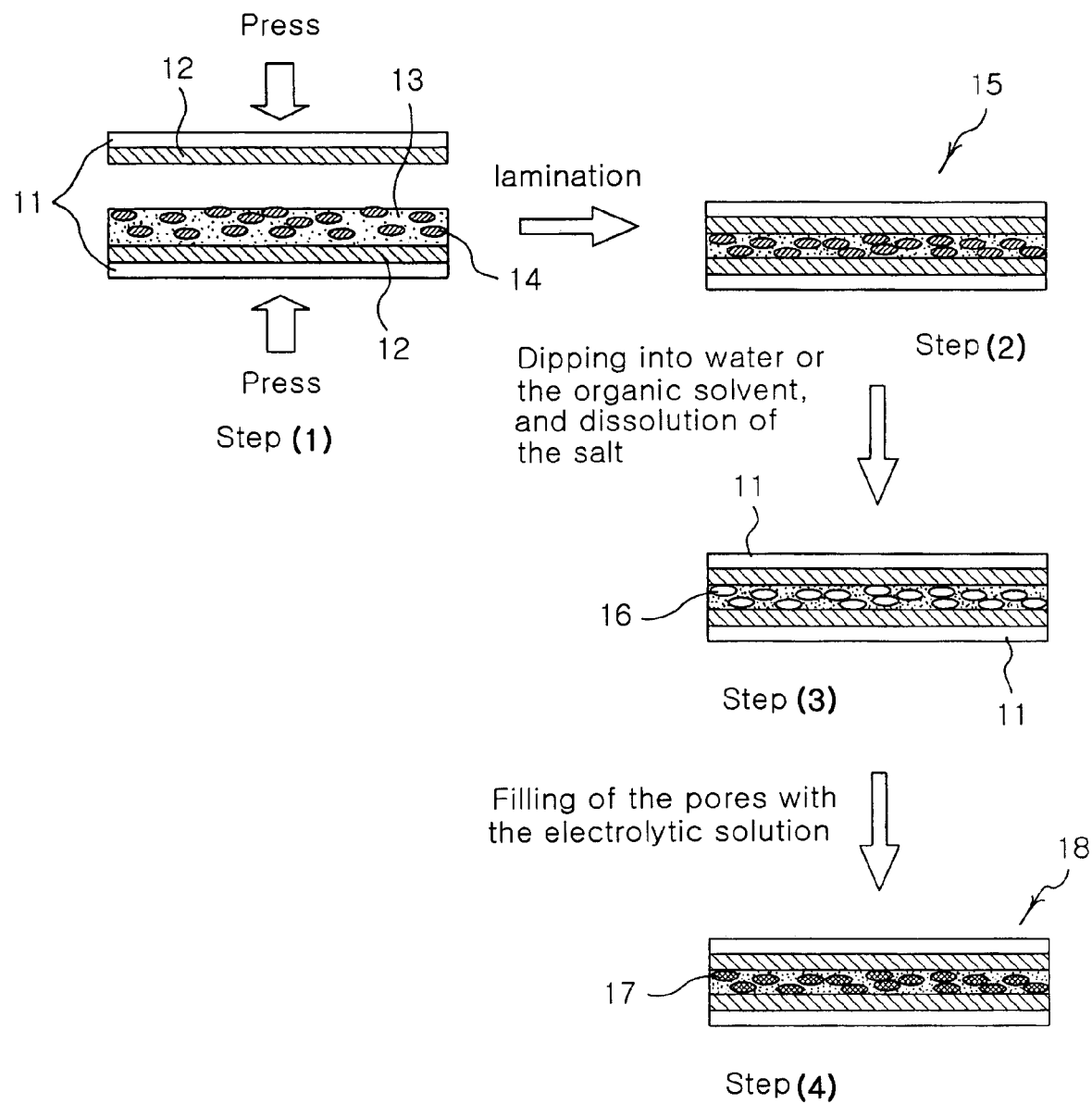
FIG. 1 illustrates production of a polymer capacitor according to the present invention.

FIG. 1 schematically illustrates the production of a polymer capacitor according to the present invention. Hereinafter, a detailed description will be given of the production of a polymer capacitor having uniform pores according to the present invention, referring to FIG. 1.

A metal electrode 11 is formed on a surface of a film-shaped ion exchange resin solid 12, and a mixture of an ion exchange resin solution 13 and a salt 14 is coated on the other surface of the ion exchange resin solid 12 on which the metal electrode 11 is not formed.

The metal electrode 11 may be exemplified by platinum, gold, copper, zinc, aluminum, or nickel.

Where the ion exchange resin solid 12 and ion exchange resin solution 13 are a cation exchange resin or an anion exchange resin, the ion exchange resin solid 12 and the ion exchange resin solution 13 may be used in conjunction with other types of ion exchange resins. However, the anion exchange resin and cation exchange resin must not be used simultaneously.

The cation exchange resin may be embodied by strong-acidic and weak-acidic cation exchange resins. In detail, examples of the cation exchange resin may include poly(2-sulfoethyl methacrylate), poly(diallyl dimethyl ammonium chloride), poly(styrene sulfonate), poly(phosphagen sulfonate), sulfonated polyimide, sulfonated poly(2,4-dimethylphenylene oxide), poly(2,4-dimethylphenylene oxide)propionic acid, sulfonated polyurethane, sulfonated polyethersulfone, sulfonated poly(benzimidazole), sulfonated poly(4-phenoxybenzoyl-1,4-phenylene), sulfonated polypropylene, sulfonated poly(methyl methacrylate), poly(tetrafluoroethylene-co-sulfonated vinylidene fluoride), poly(2,4-dimethylphenylene oxide) propenoic acid and sulfonated poly(ether ether ketone), or a mixture thereof.

Examples of the anion exchange resin may include a polystyrene resin substituted by a quaternary ammonium base and/or a polystyrene resin substituted by primary to tertiary amines.

The salt may be exemplified by $NaNO_3$, $NaCl$, $NaHCO_3$, $KHSO_4$, $Na_2SO_4$, $Na_2CO_3$, $NH_4NO_3$, $NH_4Cl$, $(NH_4)_2SO_4$, $(NH_4)_2CO_3$, $(NH_4)HCO_3$, $Ca(NO_3)_2$, $CaCl_2$, $CaSO_4$, $CaCO_3$, $Ba(NO_3)_2$, $BaCl_2$, $BaSO_4$, $BaCO_3$, $AgNO_3$, $AgCl$, $Ag_2SO_4$, $Ag_2CO_3$, or a mixture thereof. 2-85 vol % of salt is mixed with and dispersed in the ion exchange resin based on the total weight of the mixture of the ion exchange resin and salt. Undesirably, when the content of the salt is less than 2 vol %, the insufficient pores are formed, and when the content is more than 85 vol %, an ion exchange membrane film is not formed.

In consideration of the sizes of the pores to be formed, it is preferable that the salt be 100 nm-490 μm in diameter. Undesirably, when the size of each pore is less than 100 nm, the pores are insufficiently filled with the electrolytic solution, and when the size is more than 490 μm, an open channel is formed, hindering an ion exchange effect.

The mixture of the ion exchange resin and salt may be uniformly dispersed using, for example, a mechanical agitator, a sonicator or the like. The mixture may be dispersed through any dispersing method typically adopted, and the dispersing method is not limited.

The mixture of the ion exchange resin 13 and salt 14 is coated on the other surface of the ion exchange resin film which has the metal electrode 11 on the one side thereof. It is preferable that the mixture be coated in a thickness of about 10-500 μm. Undesirably, when the thickness is less than 10 μm, since a volume of pores to be filled with the electrolytic solution is much smaller than the total volume of the capacitor, it is impossible to improve capacitance, and when the thickness is more than 500 μm, improvement of capacitance by an increase in the volume is insignificant. The coating may be implemented by employing a roll coater, a doctor blade, a spin coater, a spray coater or the like, according to a traditional process.

Subsequently, ion exchange resin surface of another ion exchange resin solid film 12 having a metal electrode 11 formed on a surface thereof, is placed on the coated layer 13 of the mixture of the ion exchange resin and the salt as shown in a step 1 of FIG. 1. Thereafter, the resulting structure is pressed for lamination, thereby producing a composite 15 as shown in a step 2 of FIG. 1.

The lamination may be conducted in typical conditions, for example, at 100-180° C. under pressure of 30-100 MPa, which does not limit the present invention.

Next, the composite 15 is dipped into water or organic solvent as a solvent to dissolve the salt 14 existing in the ion exchange resin, thereby forming pores 16 in the ion exchange resin membrane as shown in a step 3 of FIG. 1.

Any solvent capable of dissolving the salt may be used, and water is most frequently employed. Furthermore, an organic solvent capable of dissolving the salt may be properly selected according to the type of salt used. Illustrating, but non-limiting examples of the solvent may include alcohol and ketone, in detail, acetone, tetrahydrofuran(THF), dimethyl formamide(DMF), acetonitrile, pyrrolidone, or dimethyl acetamide(DMAc).

The pores formed in the ion exchange membrane by dissolving the salt are filled with the electrolytic solution 17 to produce a polymer capacitor 18 as shown in a step 4 of FIG. 1.

Examples of the electrolytic solution may include a lithium ion solution such as a $LiClO_4$ solution, a $LiCF_3SO_3$ solution, a $LiPF_6$ solution, a $LiBF_4$ solution, or a mixture thereof.

The electrolytic solution may be absorbed into the composite having the pores to produce the capacitor. The composite may be dipped in the electrolytic solution, or the electrolytic solution may be added in drops to the composite to impregnate the pores formed in the ion exchange resin membrane with the electrolytic solution.

Figure 2:
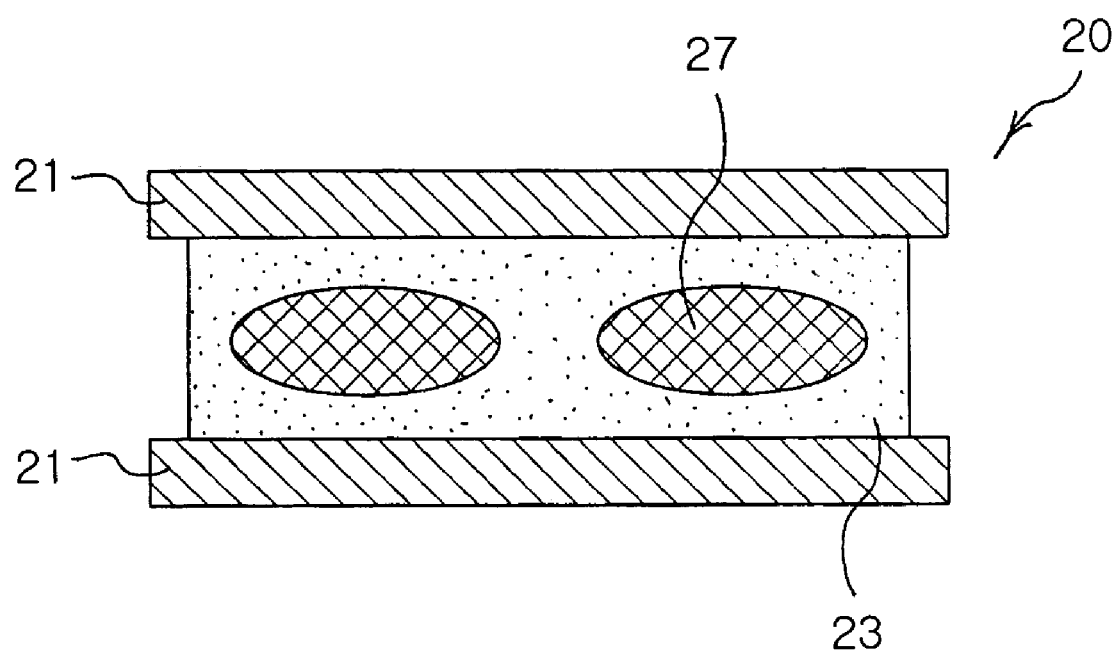
FIG. 2 is a sectional view of the polymer capacitor produced according to a method of the present invention, in which micropores containing an electrolytic solution are formed in an ion exchange membrane.

FIG. 2 illustrates a sectional view of the polymer capacitor produced according to a method of the present invention. As shown in FIG. 2, the polymer capacitor 20 produced through the method of the present invention includes the two metal electrodes 21 and the ion exchange resin 23 interposed between the two metal electrodes 21, and the ion exchange resin 23 has a plurality of uniform micropores 27 filled with the electrolytic solution. The micropores 27 are uniformly formed in the ion exchange resin membrane according to the method of the present invention, and thus, the polymer capacitor 20 has reproducible and excellent capacitance and energy density.

A better understanding of the present invention may be obtained through the following example which is set forth to illustrate, but is not to be construed as the limit of the present invention.

EXAMPLE 1

5 vol % of $(NH_4)HCO_3$ having an average particle diameter of 150 nm was added to 100 g of Nafion solution acting as an ion exchange resin, and then agitated using a mechanical agitator for 30 min to produce a mixture. Meanwhile, an Au metal chelate was adsorbed onto a surface of the film-shaped Nafion ion exchange resin, and the resulting structure was reduced to deposit a metal on a surface thereof, thereby forming an Au electrode.

Subsequently, the mixture of the ion exchange resin and salt was coated on the other surface of the Nafion ion exchange resin film, on which no electrode was formed, using an applicator in a thickness of 100 mm.

Next, the ion exchange resin film, on which the Au electrode was formed through a procedure that the Au metal chelate was adsorbed onto the surface of the Nafion ion exchange resin film and the resulting structure was reduced to deposit the metal on the surface thereof, was seated on a coated layer of the mixture so that an ion exchange resin surface of the film comes into contact with the mixture, and subjected to a lamination process at 150° C. and pressure of 32 Mpa to produce an electrode composite.

The composite was dipped in water at room temperature for 30 min to dissolve the salt, thereby forming pores therein.

The composite having the pores formed therein is dipped into a $LiClO_4$ electrolytic solution to fill the pores with the electrolytic solution, thereby producing a polymer capacitor.

In the present invention, after an ion exchange resin layer is formed using a mixture of an ion exchange resin solution and a salt, the salt is removed from the ion exchange resin layer by dissolution. Thereby, it is possible to uniformly control the number, sizes and distribution of pores in a polymer capacitor. Furthermore, the polymer capacitor having the pores, which are filled with an electrolytic solution and formed in the ion exchange resin layer, has excellent and reproducible electrical properties, such as capacitance and energy density.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method of producing a polymer capacitor, comprising:
   forming a first metal electrode on a surface of a first ion exchange resin solid and coating a mixture of an ion exchange resin solution and a salt on the other surface of the first ion exchange resin solid;
   putting an ion exchange resin surface of a second ion exchange resin solid having a second metal electrode formed on a surface thereof on the coated layer of the mixture of the ion exchange resin solution and salt, and conducting lamination of the resulting structure to produce a composite;
   dipping the composite into water or an organic solvent to dissolve the salt and thus form pores; and
   filling the pores with an electrolytic solution.

2. The method as set forth in claim 1, wherein the first and second metal electrodes are selected from the group consisting of platinum, gold, copper, zinc, aluminum, and nickel.

3. The method as set forth in claim 1, wherein the ion exchange resin is at least one cation exchange resin selected from the group consisting of poly(2-sulfoethyl methacrylate), poly(diallyl dimethyl ammonium chloride), poly(styrene sulfonate), poly(phosphagen sulfonate), sulfonated polyimide, sulfonated poly(2,4-dimethylphenylene oxide), poly(2,4-dimethylphenylene oxide)propionic acid, sulfonated polyurethane, sulfonated polyethersulfone, sulfonated poly(benzimidazole), sulfonated poly(4-phenoxybenzoyl-1,4-phenylene), sulfonated polypropylene, sulfonated poly(methyl methacrylate), poly(tetrafluoroethylene-co-sulfonated vinylidene fluoride), poly(2,4-dimethylphenylene oxide) propenoic acid and sulfonated poly(ether ether ketone).

4. The method as set forth in claim 1, wherein the ion exchange resin is a least one anion exchange resin selected from the group consisting of polystyrene resin substituted by a quaternary ammonium base and a polystyrene resin substituted by primary to tertiary amines.

5. The method as set forth in claim 1, wherein the salt is at least one selected from the group consisting of $NaNO_3$, $NaCl$, $NaHCO_3$, $KHSO_4$, $Na_2SO_4$, $Na_2CO_3$, $NH_4NO_3$, $NH_4Cl$, $(NH_4)_2SO_4$, $(NH_4)_2CO_3$, $(NH_4)HCO_3$, $Ca(NO_3)_2$, $CaCl_2$, $CaSO_4$, $CaCO_3$, $Ba(NO_3)_2$, $BaCl_2$, $BaSO_4$, $BaCO_3$, $AgNO_3$, $AgCl$, $Ag_2SO_4$, and $Ag_2CO_3$.

6. The method as set forth in claim 1, wherein 2-85 vol % of salt is mixed with and dispersed in the ion exchange resin based on a total weight of the mixture of the ion exchange resin and the salt.

7. The method as set forth in claim 1, wherein the salt is 100 nm-490 μm in diameter.

8. The method as set forth in claim 1, wherein the mixture is coated in a thickness of about 10-500 μm.

9. The method as set forth in claim 1, wherein the solvent is selected from the group consisting of water, alcohol, acetone, tetrahydrofuran(THF), dimethyl formamide (DMF), acetonitrile, pyrrolidone, and dimethyl acetamide (DMAc).

10. The method as set forth in claim 1, wherein the electrolytic solution is a lithium ion solution.

11. The method as set forth in claim 1, wherein the lithium ion solution is selected from the group consisting of $LiClO_4$, $LiCF_3SO_3$, $LiPF_6$, and $LiBF_4$.

* * * * *